Figure 5:
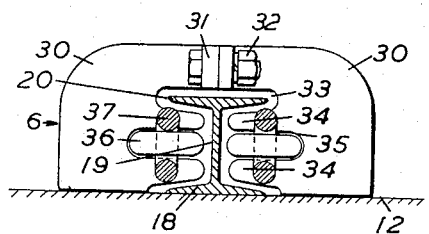

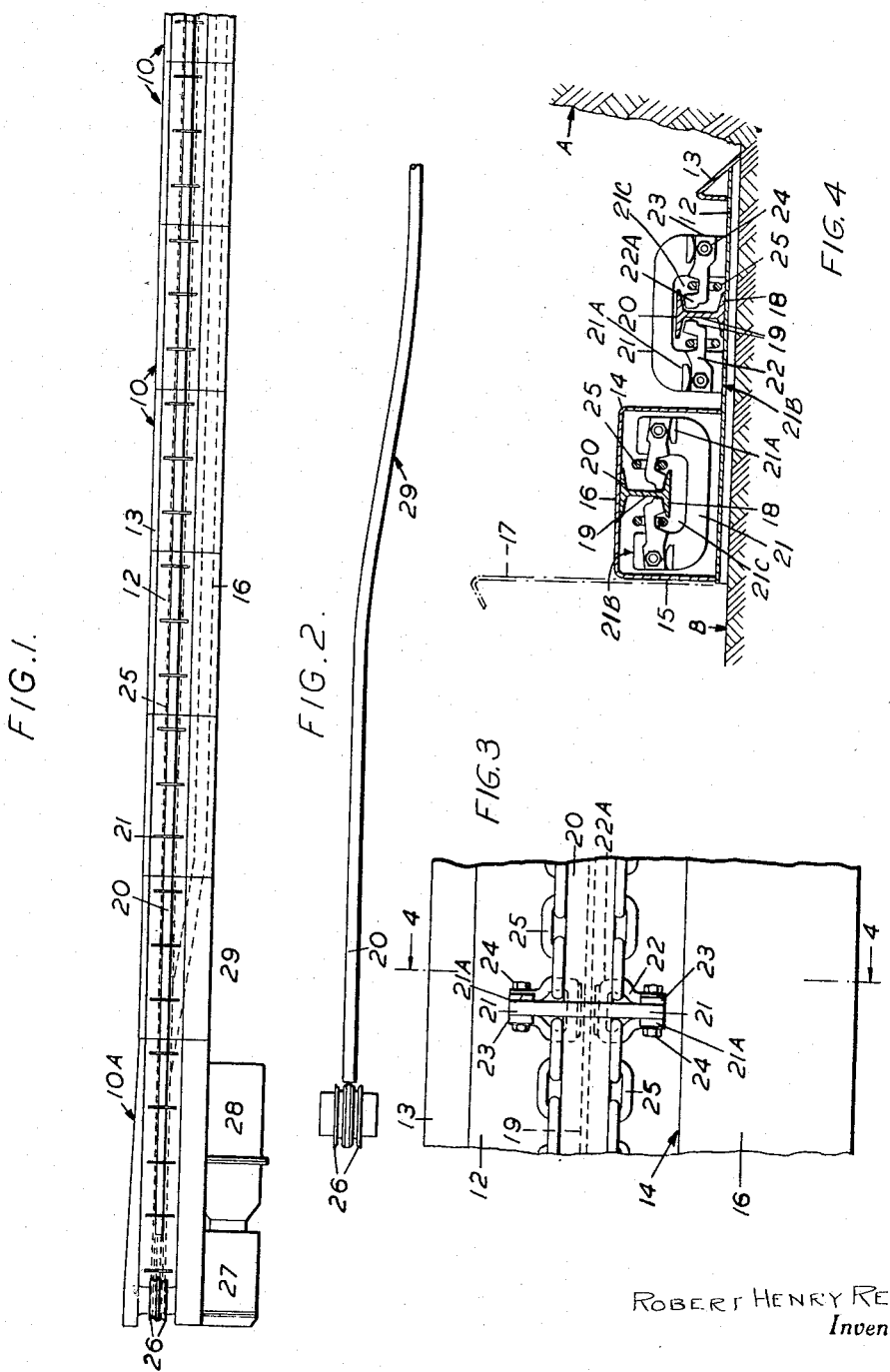

Sept. 27, 1955    R. H. REED    2,718,962
SCRAPER CONVEYORS
Filed Sept. 12, 1952    2 Sheets—Sheet 2

*Inventor*
ROBERT HENRY REED

*By*
Richardson, Davidson Norden
*his Attorneys.*

United States Patent Office 2,718,962
Patented Sept. 27, 1955

2,718,962

SCRAPER CONVEYORS

Robert Henry Reed, Glasgow, Scotland, assignor to Mavor & Coulson Limited, Glasgow, Scotland Application September 12, 1952, Serial No. 309,229

10 Claims. (Cl. 198—172)

This invention relates to conveyors designed for heavy work, such for instance as is undertaken in coal mines, and of the type including an endless series of interconnected components which in their working run travel along a passage and entrain with them coal or other mineral supplied to said passage for conveyance. Conveyors of this type, known as "scraper conveyors," are used for instance as so-called "face conveyors" in coal mines worked by the "longwall" system for the conveyance of coal stripped from the face of the seam.

Scraper conveyors as hitherto used generally include an endless series of equispaced components, constituting the "scrapers," and either a pair of endless side chains, to which these components are attached at their ends, or a single endless central chain to which the components are attached midway of their length. The passage is provided by a stationary frame structure, composed of end-to-end sections, along which the components of the working run travel.

It is desirable to provide the frame structure of a mine face conveyor with a wall at the "goaf" side (that is, the outer side beyond which the already worked out area, or "goaf," of the mine extends) which wall is comparatively high in order to act as a retainer for the broken down mineral matter supplied from the face to the conveyor for entrainment by the series of components.

It is also desirable that a conveyor of the type stated, when designed for work as a face conveyor, shall work close to the mine floor in order that either the mining machine can readily transfer the broken-down coal laterally outward from the face and mine floor to the conveyance passage along which the scraper components travel or the conveyor can be forced laterally inwards below the broken down coal.

It is also desirable that a conveyor of the type stated, when designed for work as a face conveyor, shall be compact in width in order that propping of the otherwise unsupported mine roof can be extended reasonably close to the face, the conveyor being arranged alongside the face and coming between the face and the propped goaf.

Moreover, when such a conveyor has to be used in co-operation with a continuous mining machine, it is also desirable that the conveyor can be laterally advanced without dismantling, or "snaked" as it is called, in order that as the face is progressively cut away the conveyor can be brought section-after-section as close as practicable to the new face.

The object of the invention is to provide an improved conveyor of the type stated capable of having the aforesaid desirable features.

In one embodiment of the present invention, a conveyor of the type stated comprises a frame structure formed with a passage having a housing along the outer side, a pair of side-by-side chains to each of which are attached mineral-entraining components each yoke-like in form with wings which define a large central opening and which, when the component is in the working passage, bear upon the base, pairs of sprockets for driving and guiding the chains so that they travel in a working run along said passage and in a return run along the interior of said housing, and guides which extend along the passage and along the housing, there being in each instance a guide between the pair of chains and the guide and chains all extending through the central openings of the mineral-entraining members. The conveyor also includes inward projections on said mineral-entraining components to engage the guides so that the guides control the components through said projections.

Preferably, such inward projections are made as connector-links to which short lengths of the conveyor chains are linked.

In another embodiment of the invention, the conveyor includes mineral-entraining components each composed of wings which are jointed together so as to contain a space for the chains and which are each formed with recesses to receive recumbent links of the chains and are each formed also with drive-transmitting projections that in use come between upstanding links joined by the recumbent links.

Preferably, the conveyor in or for which such mineral-entraining components are provided, has a central guide which extends between the two chains and which is formed with guideways into which the recumbent links and the drive-transmitting projections extend.

Examples of different embodiments of the invention are shown in the accompanying drawings, in which:

Fig. 1 is a diagrammatic plan of a long end portion of a conveyor which is one embodiment of the invention.

Fig. 2 is a corresponding plan of guide means for the mineral-entraining components when they move idly along the return run. Fig. 3 is plan of a short portion of the conveyor, being drawn to a larger scale than Fig. 1 and showing the parts in greater detail. Fig. 4 is section on the line 4—4 of Fig. 3.

Figure 6:
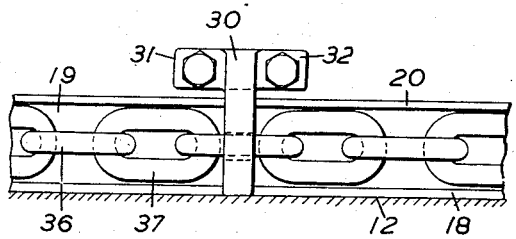
Figure 7:
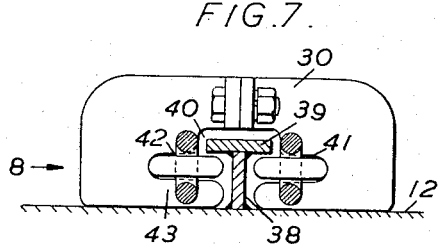
Figure 8:
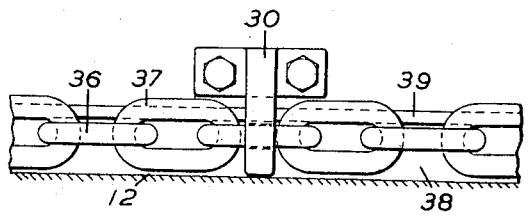

Fig. 5 is a section, corresponding to part of Fig. 4 but showing another embodiment of the invention. Fig. 6 is a side elevation, being in the direction of the arrow 6 in Fig. 5. Fig. 7 is a view corresponding to Fig. 5, but showing a modification, and Fig. 8 is a side elevation in the direction of the arrow 8 in Fig. 7.

Referring to Figs. 1 to 4, in the embodiment therein shown, the conveyor is designed for use as a face conveyor in a coal mine, if desired to cooperate with a continuous mining machine in the long-wall system. The face is indicated by A in Fig. 4. The frame structure is composed of sections 10, including an end section 10A (Fig. 1), which are interconnected in known manner end-to-end in such a manner that each section is free to move angularly sidewise and to tilt slightly in relation to each of its neighbours. Each section is built of plates which, viewed in cross-section, comprise a full-width base-plate 12 provided along its inner side with a narrow ramp 13 sloping upwards and outwards from the level of the mine floor B, a structure with side walls 14, 15 and roof 16 on the base-plate at the outer side to serve as a closed housing, and if desired an upreaching plate 17 secured to the outer wall 15 of the housing to serve as a coal-retaining wall. Between the ramp 13 and housing 14, 15, 16, there is a longitudinal I-section rail 18, 19, 20, the lower flange 18 of which is secured to the base plate 12. That portion of the base plate which extends between the housing and the ramp serves as the conveyance passage, along which the coal-engaging components travel in their working run; and the housing serves for the return run. Another similar longitudinal I-section rail is provided inside the housing, in this instance the upper flange 20 of the rail being secured to the roof 16 of the housing midway between the side walls 14, 15 thereof. These two I-section rails serve as guides for the travelling conveyor components in their working run, and return run, respectively.

The travelling coal-engaging components each consists of a yoke-like member 21 which is made of flat plate roughly of inverted U-form, as viewed when it occupies the working run, the side portions of each component being in the nature of wings having flat ends 21B which bear upon the base-plate 12, as Fig. 4 shows. These wings define a large central opening 21C. Each component has two connector links 22 secured to it, one at each end. Each connector link is formed as a longitudinal loop, as Fig. 3 shows, which ends in two spaced transverse projections 23. These form lugs engaging an end of the component 21 between them, a bolt 24 securing the lugs to the component. Each component has stops 21A, one to engage with each lug 23 and thus limit the connector links 22 to only slight pivotal freedom. Each two adjacent components are connected by two lengths of chain, each chain consisting of a series of closed links 25, the endmost of which are looped through the connector-links 22. Viewed in plan, Fig. 3, the chains extend well within the side limits of the components 21, and they project somewhat into the channels between the upper and lower flanges 18, 20 of the guide rails. It will be noted that the central openings 21C are large enough to contain both chains and the guide 19 between them. Moreover, the connector-links 22 are formed with inward projections 22A which are upturned when viewed as positioned in the working run; see Fig. 4. These projections come close to the central web 19 of the guide rails. In the working run, the projections also come close to the upper flange 20, whereas in the return run in which the components are upside down, the projections are downturned and they bear upon the lower flange, which in this instance takes the weight of the components and their chains.

At both ends of the conveyor frame structure, in line with the conveyor chains in the working run, there are sprocket-wheels, which are arranged in pairs. One pair of such wheels are indicated by 26 in Figs. 1 and 2. One or more of these pairs serve also as driving wheels, driven through appropriate gearing in a gear case 27 by an electric motor 28. The guide rail of the working run, Fig. 1, extends straight at both ends to the sprocket wheels 26, but the return-run guide rail (shown in full lines in Fig. 2 and in dotted lines in Fig. 1) is deflected at 29 so as to curve outwards and upwards gradually into the housing midway of its roof plate; see Fig. 4. It will therefore be clear that, in the pasage of each component 21 round the terminal sprocket-wheels 26 from the one run to the other, the component inverts itself as Fig. 4 shows. The lateral movement of each component in its passage from the one run to the other is freely permitted by the looseness of the chain linkages 25 between the connector-links 22 of adjacent components 21.

The chains 25, components 21 and connector links 22 together form an endless travelling assembly under the guidance of the guide rails 18, 19, 20.

It will be manifest that, when due regard is paid to the heavy work for which the conveyor is designed and to the need for continuous and substantial guide means for the hard-worked components 21 and their heavily loaded chains 25, the construction shown and described constitutes a robust and effective means of conveying said coal as it is mined. The endlessly moving parts 21, 25 are effective to entrain the full load of coal which the conveyance passage can contain.

It will also be manifest that, in operation of the conveyor, the wear due to guidance of the components and their chains and due also to the support of these travelling parts during the return, is taken by the inward projections 22A, which therefore are made heavy enough to withstand such wear.

Moreover, seeing that, in the working run, the inward projections 22A and the chain links 25 move along the channels in opposite sides of the guide rails, fine coal and dust tending to accumulate in these channels will be constantly agitated and swept away, with the result that there will be no serious chokage in the channels.

Referring to Figs. 5 and 6, the general structure of the conveyor is the same as already described with reference to Figs. 1 to 4, the only differences residing in the mineral-entraining components and their attachment to the endless chains.

As shown, the travelling coal-engaging components each consist of two wings, or halves, 30 composed mainly of plates bolted and flange-jointed together. The flanges are indicated by 31 and the bolts by 32. Each complete component, as Fig. 5 shows, has the overall form of a yoke with flat bottom edges which, when the component occupies the working run, in which it is shown, bear upon the base-plate 12. The component also has a central lower opening 33 large enough to contain both chains. In the example, each wing has a pair of projections 34 extending horizontally into said opening and, between the projections, a deep narrow recess 35. The arrangement is such that each pair of projections reaches into the channels of the I-section rail 18, 19, 20, which channels function as guideways.

Each chain consists of alternate recumbent and upright links 36 and 37. By "recumbent" is meant links in a more or less horizontal plane, and by "upright" is meant links in a more or less vertical plane.

In the assembled conveyor, a recumbent link 36 is fully accommodated in the recess 35 of each wing; and its pair of projections 34 come between the adjoining upright links 37. Thus when the chains are driven along the conveyor frame structure, the pairs of projections 34 are engaged by the upright links 37 behind them and propelled forwards.

In order to attach a component to the chains, it is simply necessary to take the two wings, as separate parts, and fit them to the chains, thereafter bolting them together. To detach a component, one unbolts the wings and removes them by a simple manipulation.

Referring to Figs. 7 and 8, in this modification of the embodiment according to Figs. 5 and 6, the guide rails are of T-section, each consisting of a vertical mid-web 38 and a transverse flat bar 39 forming side flanges, the parts 38 and 39 being welded together. The base of the T in the working-run rail is secured by welding to the base-plate 12. Correspondingly, the top of the T in the return run, the T then being inverted, will be secured by welding to the roof of the housing (the roof being as indicated by 16 in Fig. 4). In this example, the chain openings are of simpler form, as shown in Fig. 7, the opening 40 in each component 30 is roughly rectangular, having deep side recesses 41 which accommodate the recumbent links 36 and above and below which are inward drive-transmitting projections 42 and 43. The upper of these projections extends only sufficiently to register with the upright links 37, whereas the lower projections 43 extend far enough to enter the channels formed between each flange of the bar 39 and the base-plate 12 (or roof 16).

I claim:
1. A conveyor designed for heavy work and of the type stated comprising a frame structure, a base incorporated in said structure to serve as a conveyance passage, a guide secured on said base and extending along said passage, a pair of side-by-side chains of inter-looping links arranged to travel along said passage with said guide between them, mineral-entraining components each yoke-like in form with wings which define a central opening and which bear upon the base, said components being arranged so that said guide and both chains extend along the base and through the central openings, and projections on the wings of each of said components, said projections extending into the central opening and engaging links of both chains so that the chains and components form a travelling as- sembly, and said guide being engaged at its opposite sides within said central openings by components of said travelling assembly for guidance thereof.

2. A conveyor according to claim 1 in which the projections on the wings are made as connector-links to which short lengths of the conveyor chains are linked.

3. A conveyor according to claim 2 in which the projections on the wings extend towards one another sufficiently to bear against and derive guidance from the guide between said chains.

4. A conveyor designed for heavy work and of the type stated comprising a frame structure, a base incorporated in said structure, said base having an inner side and an outer side, a working passage along said inner side, a housing along said outer side, said housing incorporating a roof, a guide secured upright on said base and extending along said working passage and a guide secured inverted on the underside of said roof and extending along said housing, two endless chains of inter-looping links, sprockets for driving and guiding both chains so that they travel side-by-side as a pair with either of said guides between them in each of two runs which are spaced sidewise apart, namely a working run along said passage and a return run along the interior of said housing, mineral-entraining components each yoke-like in form with wings which define a central opening and which bear upon the base when the component is in the working passage, said components being arranged so that one of said guides and the associated run of chains extend through the central openings, and projections on the wings of each of said components, said projections extending into the central opening and engaging links of both chains so that the chains and components form an endless travelling assembly, and each of said guides being engaged at its opposite sides within said central openings by components of said travelling assembly for guidance thereof.

5. A conveyor according to claim 4 in which the projections on the wings are made as connector-links to which short lengths of the conveyor chains are linked.

6. A conveyor according to claim 5 in which the projections on the wings extend towards one another sufficiently to bear against and derive guidance from the guide between said chains.

7. A conveyor according to claim 4 having said mineral-entraining components each composed of wings which are jointed together so as to contain the required central opening for the guide-and-chains assembly and which are each formed with recesses to receive recumbent links of the chains and are each formed also with drive-transmitting projections that in use come between upstanding links joined by the recumbent links.

8. A conveyor according to claim 5 having said guides each formed with guideways into which the recumbent links and the drive-transmitting projections extend.

9. A conveyor designed for heavy work and of the type stated comprising a frame structure, a base incorporated in said structure to serve as a conveyance passage, a guide secured on said base and extending along said passage, a pair of side-by-side chains of inter-looping links arranged to travel along said passage with said guide between them, mineral-entraining components each yoke-like in form with wings which are jointed together to define a central opening and which bear upon the base, said components being arranged so that said guide and both chains extend along the base and through the central openings, recesses formed in both wings of each mineral-entraining member to receive recumbent links of both chains, and drive-transmitting projections formed in both wings of each said member to come between upstanding links joined together by said recumbent links.

10. A conveyor according to claim 9 having said guides each formed with guideways into which the recumbent links and the drive-transmitting projections extend.

References Cited in the file of this patent

UNITED STATES PATENTS

| 731,754 | Clarke | June 23, 1903 |
| 2,297,632 | Mosley | Sept. 29, 1942 |

FOREIGN PATENTS

| 655,370 | Germany | Jan. 14, 1938 |